(12) United States Patent  
Kufner et al.

(10) Patent No.: US 8,348,100 B2  
(45) Date of Patent: Jan. 8, 2013

(54) DEVICE AND METHOD FOR DELIVERING A FLUID, IN PARTICULAR HOT-MELT ADHESIVE

(75) Inventors: Hubert Kufner, Luneburg (DE); Thomas Burmester, Beckede (DE)

(73) Assignee: Nordson Corporation, Westlake, OH (US)

( * ) Notice: Subject to any disclaimer, the term of this patent is extended or adjusted under 35 U.S.C. 154(b) by 1134 days.

(21) Appl. No.: 12/243,395

(22) Filed: Oct. 1, 2008

(65) Prior Publication Data

US 2009/0098287 A1 Apr. 16, 2009

(30) Foreign Application Priority Data

Oct. 5, 2007 (DE) .......................... 10 2007 048 046

(51) Int. Cl.  
*B05D 5/10* (2006.01)

(52) U.S. Cl. ..................... 222/146.5; 222/504; 222/559; 222/146.2; 165/170; 427/207.1; 118/59

(58) Field of Classification Search ............... 222/146.2, 222/146.5, 504, 559; 165/146, 147, 168, 165/170; 427/207.1; 118/59  
See application file for complete search history.

(56) References Cited

U.S. PATENT DOCUMENTS

| | | | | |
|---|---|---|---|---|
| 2,060,440 A | * | 11/1936 | Rosenblad | 165/146 |
| 4,286,365 A | * | 9/1981 | Creighton | 29/890.042 |
| 4,485,942 A | * | 12/1984 | Petrecca | 222/146.5 |
| 4,679,710 A | * | 7/1987 | Jameson et al. | 222/190 |
| 4,782,212 A | * | 11/1988 | Bakke | 392/470 |
| 4,866,250 A | * | 9/1989 | Pasbrig | 392/479 |
| 5,353,868 A | * | 10/1994 | Abbott | 165/171 |
| 5,542,578 A | * | 8/1996 | Buckles | 222/145.6 |
| 6,938,688 B2 | * | 9/2005 | Lengauer et al. | 165/170 |
| 7,156,261 B2 | * | 1/2007 | Saidman et al. | 222/146.5 |
| 2005/0051312 A1 | * | 3/2005 | Lingier | 165/168 |

FOREIGN PATENT DOCUMENTS

EP 1419826 A2 5/2004

OTHER PUBLICATIONS

Intellectual Property Office of the People's Republic of China, First Office Action in Chinese Patent Application No. 200810168982.X, dated Jan. 31, 2012.

* cited by examiner

*Primary Examiner* — J. Casimer Jacyna

(74) *Attorney, Agent, or Firm* — Wood, Herron & Evans, L.L.P.

(57) ABSTRACT

A device and a method for delivering a fluid, in particular hot-melt adhesive. The device includes a base member having an inlet opening for receiving the fluid from a fluid source and an outlet opening for delivering the fluid to a nozzle arrangement. The nozzle arrangement has a discharge passage with a discharge opening for delivery of the fluid. A heat transfer member heats or cools the fluid and includes a heat transfer passage through which the fluid can flow. The heat transfer passage is of a flow cross-section which changes in the flow direction.

10 Claims, 5 Drawing Sheets

DEVICE AND METHOD FOR DELIVERING A FLUID, IN PARTICULAR HOT-MELT ADHESIVE

The present application claims the priority of German Patent Application No. 102007048046.8 filed Oct. 5, 2007 under 35 U.S.C. §119, the disclosure of which is hereby fully incorporated by reference herein.

TECHNICAL FIELD

The present invention relates to a device and method for delivering a fluid, such as hot-melt adhesive.

BACKGROUND

In many industrial applications, free-flowing materials (fluids) are delivered with the aid of fluid delivery devices and placed or dispensed onto substrates. The fluids may be adhesives, paints, sealing materials or gases, for example, and the substrates may be sanitary articles, plastic films, furniture or machine parts and the like. Depending on the specific application, the fluids may be delivered in the form of beads, strips or films, for example, or the material may be sprayed, if necessary, with the aid of a gaseous stream that influences the fluid. The fluid delivery devices are connected to a fluid source, for example a container for adhesives, and the fluid is transported with the aid of a pump to a discharge opening that is circular or slot-shaped, for example.

In some applications, it is advantageous or necessary that the fluid be heated before it is delivered. In the case of spraying methods, it may be advantageous to heat a gas that affects a liquid to be delivered. In many applications, it may be necessary to heat a liquid to be delivered, in particular a fluid hot-melt adhesive prior to delivery and application to a substrate or material. A fluid delivery device with an integrated heat transfer chamber is known from the applicant's patent EP 1 419 826 A2, for example, in which it was proposed that a structure with cavities, made in particular of a sintering material, be disposed in a heat transfer chamber in order to influence the transfer of heat in an advantageous manner.

There is a need for further improvement of fluid delivery devices which have a heat transfer member. There is therefore a need to optimize the fluid mechanics of heat transfer member for heating or also for cooling a fluid, so that they can be better adapted to changing viscosities of the fluid, for example. There is also a need to reduce the geometrical dimensions of the fluid delivery device as a whole. In many cases, it is also necessary to process and apply temperature-sensitive fluids, particularly hot-melt adhesives or thermoplastic materials which must be gently heated, without causing temporary local overheating and hence detrimental impacts on the properties of the material.

The object of the present invention is to specify a device and a method for delivering a fluid, and a heat transfer member for a fluid delivery device, which take up relatively little installation space and/or which are suitable for processing temperature-sensitive fluids, particularly hot-melt adhesives, and/or are fluidically optimized, especially with regard to changing viscosities of the fluids.

SUMMARY

The invention achieves this object, according to a first aspect of the invention, with a device of the kind specified at the outset, in which the heat transfer passage is of a flow cross-section which changes in the flow direction.

A heat transfer member is fluidically optimized due to the flow cross-section of the heat transfer passage changing in the flow direction of the fluid. Depending on the respective fluid temperature, the viscosity of the fluid changes during heating or cooling. As a result of such change, there is also a change in the flow resistances, flow speeds and shearing forces within the fluid. By virtue of the heat transfer passage having a flow cross-section that changes and is adapted to the respective application conditions, the flow speed and/or shearing forces or other parameters can be adapted or positively affected, depending on the specific application, so that the fluid is gently heated or cooled.

In one particularly preferred embodiment in which, for example, hot-melt adhesive or other fluid or gases are to be delivered, it is proposed that the heat transfer passage has a flow cross-section which decreases, at least in sections thereof, in the direction of fluid flow. In this way, consideration is given to the fact that the viscosity usually decreases with increasing fluid temperature. Flow cross-sections which decrease in this manner result in a substantially uniform flow resistance and possibly also in uniform flow speed and shearing forces in the fluid.

Another embodiment of the invention is characterized in that the heat transfer passage is defined by heat transfer surfaces which are arranged in substantially mutually parallel relationship, and the mutual spacing of which decreases in the direction of the intended preferred flow of material. A decreasing flow cross-section is therefore realized with this relatively simple design measure.

According to another aspect or embodiment of the invention, the heat transfer passage is of a substantially meander-shaped configuration, at least in portions thereof. By means of such a meander-shaped configuration, the design and production of a fluid delivery device can be made especially compact.

In one embodiment, it is proposed that the heat transfer member comprise a base member through which the heat transfer passage defined by the heat transfer surfaces extends along a curved path disposed between two closure elements. The base member is configured with at least one closure element to receive a heating or cooling element. The fluid thus flows in a meandering manner along a curved path, thus achieving efficient heat transfer within a small installation space. It is advantageous when at least one closure element of the base member, or the base member itself, is adapted to receive a sealing element.

According to a further aspect, the invention achieves its object in a device of the kind specified at the outset, and/or is advantageously developed, in that the heat transfer member has a plurality of plates which each have at least one respective contact face and are so arranged that the contact faces of two adjacent plates are respectively connected to each other, wherein a continuous heat transfer passage extends through the entirety of the plates in their connected state, and the plates have apertures, in particular through openings, for receiving heating elements.

Due to the plurality of plates, the heat transfer member has a sandwich construction which provides advantages in production engineering, especially. If so required, the size and thermal capacity of the heat transfer member can be adapted in a simple manner by selecting the appropriate number of plates.

According to the embodiment of the invention with a meander-shaped configuration of the flow passage, it is proposed that, on at least one face, the plates have an aperture which does not extend completely through the thickness of a plate, and that the apertures have at least one through opening in an end portion of an aperture, which through opening is adapted for the through flow of fluid from one aperture into the aperture in an adjacent plate, so that the entire heat transfer passage is embodied by coupling the apertures. It is advantageous when the plates are adapted with at least one contact face to receive a sealing element. The outer plates of an assembly of plates can preferably be closed by means of closure elements.

According to one other aspect of the invention, the heat transfer surfaces of the heat transfer member are configured so that a reference output temperature of the fluid can be set, and that the heat transfer surfaces of the heat transfer member are designed with a surface area of such magnitude as to permit the attainment of the reference temperature by a heating temperature of the heat transfer surfaces, which is substantially equal to the reference temperature of the fluid.

According to an exemplary method of the invention, the reference temperature of the fluid is reached when the fluid flows over the heat transfer surfaces of the heat transfer member, and a heating temperature is substantially equal to the reference temperature of the fluid obtains at heat transfer surfaces.

By dimensioning the heat transfer passage in the manner of the invention such that, when the fluid is flowing through or has finished flowing through the heat transfer member, the actual or reference temperature of the fluid is substantially equal to the heating temperature of the heat transfer surfaces, i.e., the fluid has reached their surface temperature; particularly gentle heating (or cooling) of the fluid can thus be achieved, which is advantageous in the case of temperature-sensitive fluids, and particularly of thermoplastic adhesives, and any local damage due to overheating is prevented. In other words, by dimensioning the passage in the manner described, the selected surface temperature is so low that overheating or excessive temperature gradients in the fluid are effectively prevented.

According to one embodiment of the invention, it is proposed that the heat transfer member is essentially produced from a strongly heat-conducting material, such as copper or aluminum. It is particularly advantageous for the production process when the heat transfer passage is produced by wire erosion.

BRIEF DESCRIPTION OF THE DRAWINGS

The invention shall now be described on the basis of embodiments and with reference to the Figures, in which.

DETAILED DESCRIPTION

Figure 1:
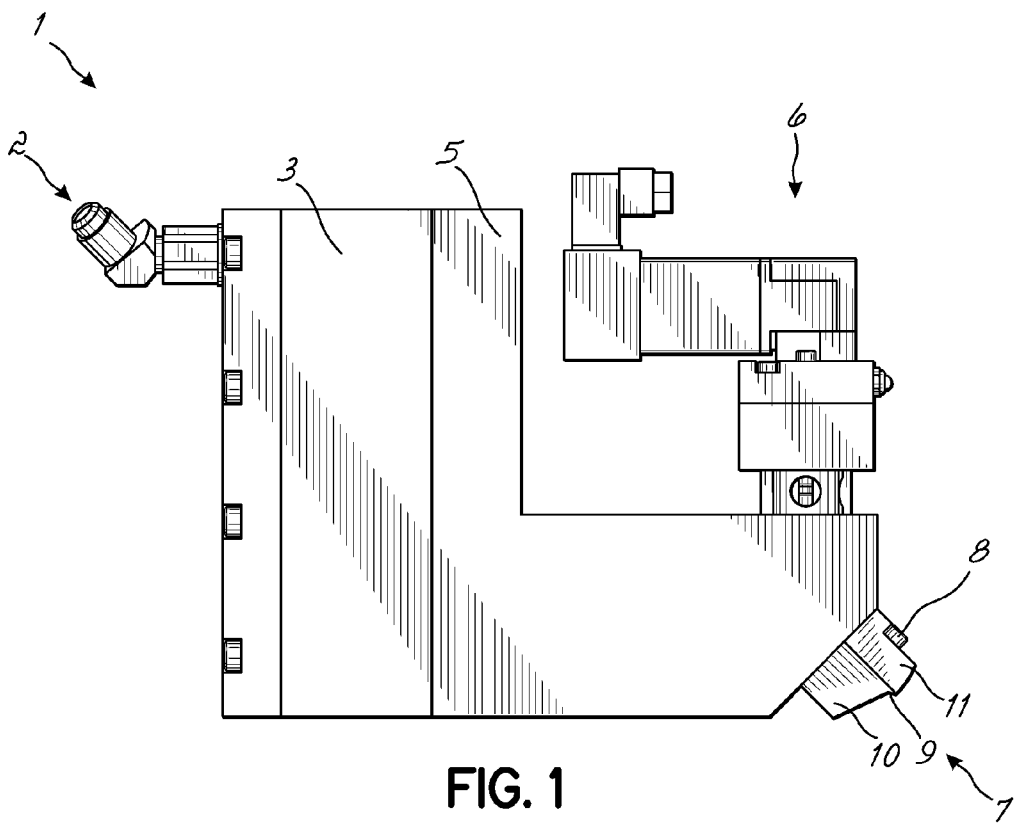
FIG. 1 shows a side elevation view of a dispensing head according to an embodiment of the invention.

FIG. 1 shows a device 1 according to an embodiment of the invention for delivering fluid. Device 1 may also be referred to as dispensing head 1. Fluid, in particular a liquid hot-melt adhesive, is supplied to device 1 through an inlet opening 2.

The fluid flows through a heat transfer member 3 which is fixed to a base member 5 with fasteners 4. In the embodiment shown, screw connections are provided as fasteners 4, but other, preferably releasable connections, such as plug connections or the sliding of parts into one another by means of rails, can likewise be considered advantageous. In heat transfer member 3, the fluid flowing therethrough is brought to a desired, and in particular a selectable reference temperature which is substantially identical to the discharge temperature of the fluid. A control unit 6 is likewise fixed to base member 5. Control unit 6 cooperates with a valve mechanism and controls the selectably intermittent or continuous delivery of fluid and application of the fluid to a substrate.

A nozzle arrangement 7 is also fixed to base member 5. Fluid is received by nozzle arrangement 7 from base member 5 and dispensed through a discharge opening 9. Nozzle arrangement 7 also has a mouthpiece holder 10 and a mouthpiece 11, which is fixed to mouthpiece holder 10 with fasteners 8. Discharge opening 9 may be wholly or partially embodied in mouthpiece holder 10 or in mouthpiece 11.

Figure 2:
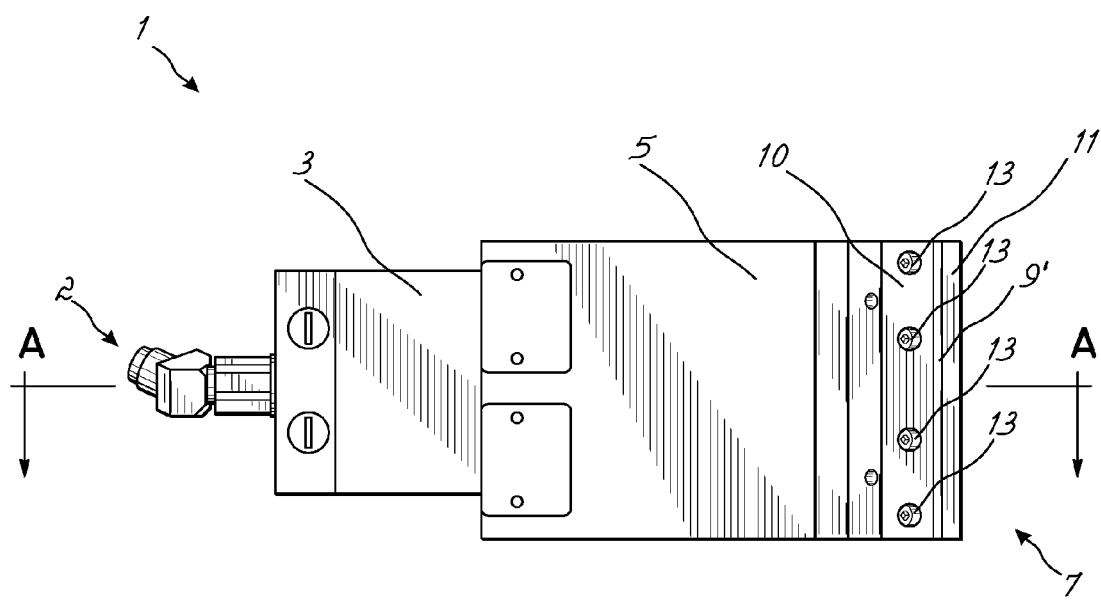
FIG. 2 shows a view from below of the dispensing head in FIG. 1.

FIG. 2 shows a plan view from below of device 1 in FIG. 1. It shows inlet opening 2 through which fluid is supplied to device 1, heat transfer member 3, base member 5 and nozzle arrangement 7 mounted on base member 5. Mouthpiece holder 10 is connected to base member 5 by fasteners 13. The discharge opening 9 of nozzle arrangement 7 is configured as a slot nozzle 9'. Mouthpiece 11 extends along the entire length of mouthpiece holder 10. A cross-sectional plane A-A is positioned substantially symmetrical through device 1, such that inlet opening 2, heat transfer member 3, base member 5, control unit 6 and nozzle arrangement 7 are shown in cross-section.

Figure 3:
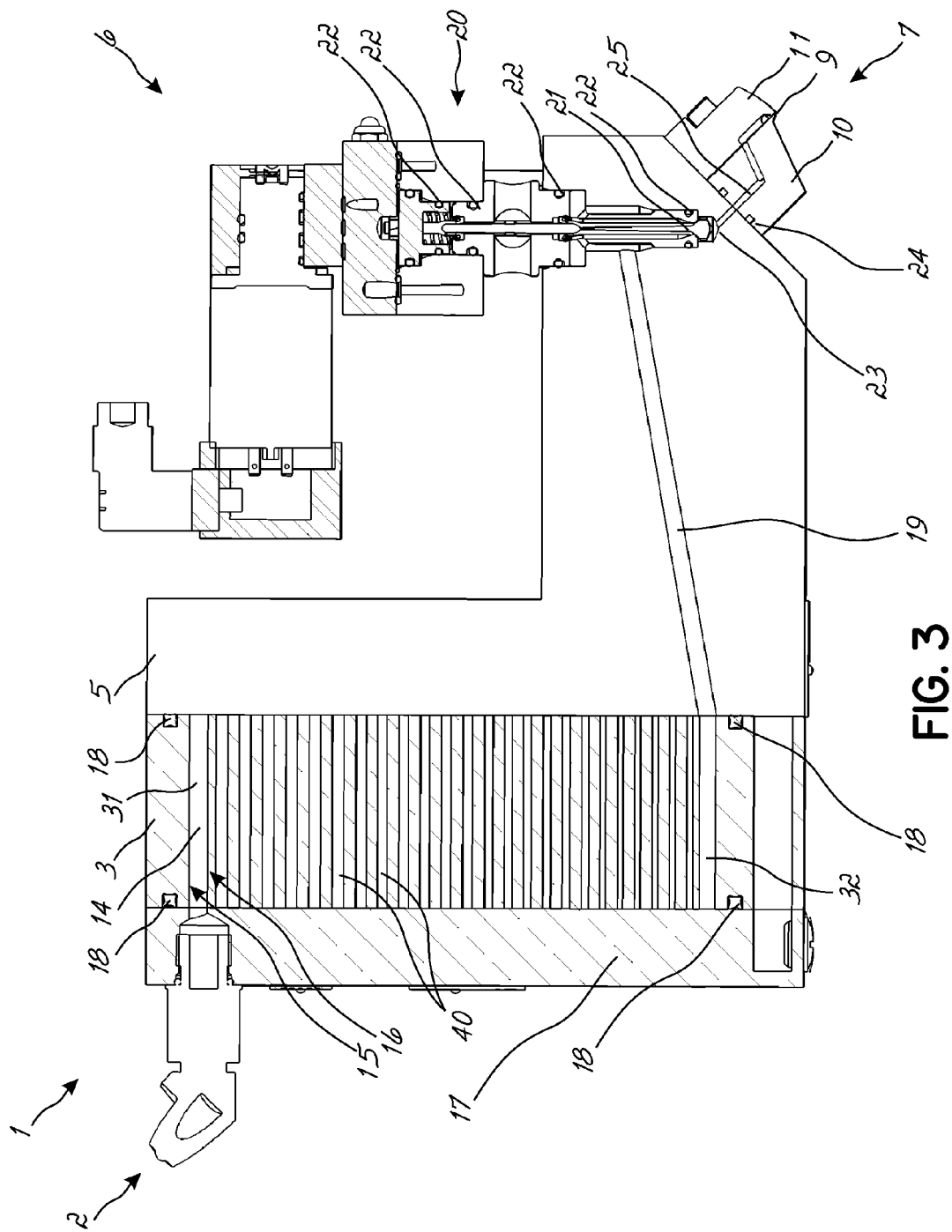
FIG. 3 shows a cross-section of a side elevation view of the dispenser head in FIGS. 1 and 2, in the sectional plane A-A as shown in FIG. 2.
Figure 5:
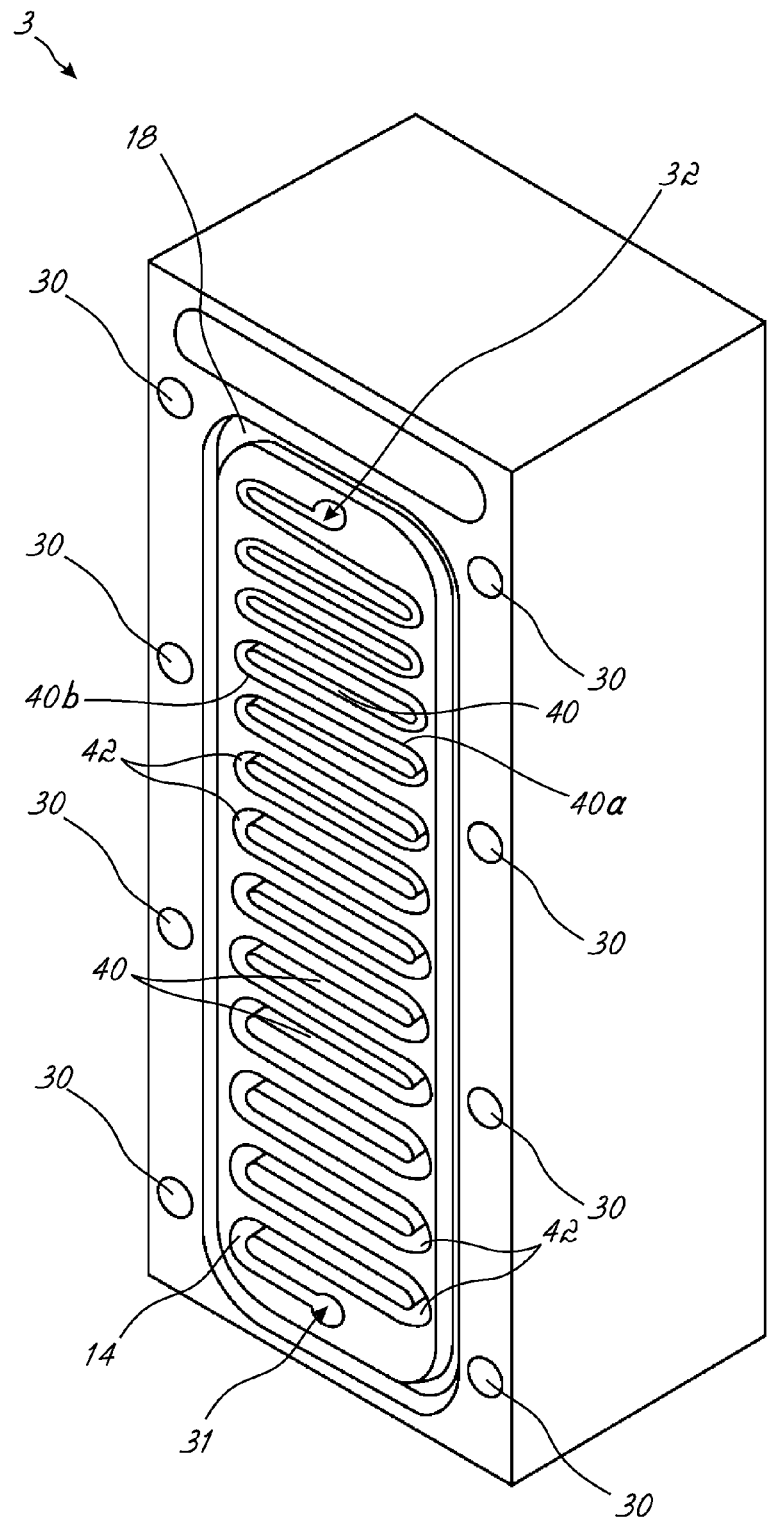
FIG. 5 shows a perspective view of an embodiment of a heat transfer member.

FIG. 3 shows a cross-section of device 1 through sectional plane A-A. The path taken by the fluid until it is delivered to the substrate can readily be seen from the FIG. 3. After entering through inlet opening 2, the fluid is fed to heat transfer member 3. Heat transfer member 3 has a heat transfer passage 14 which has a plurality of parallel subsections in the form of generally planar passage portions 40 defined by two opposite heat transfer surfaces 15, 16. In the embodiment shown, heat transfer passage 14 has a meander-shaped configuration which is also shown in FIG. 5 to aid understanding. In this regard, FIG. 5 shows that each planar passage portion 40 is connected at a first end 40a to a U-shaped passage portion 42 leading to the previous planar passage portion 40, and connected at a second end 40b to a U-shaped passage portion 40 leading to the next planar passage portion 40. The flow cross-section of the heat transfer passage is not constant. Due to the changing distance between the heat transfer surfaces, the flow cross-section decreases in the direction of flow.

Heat transfer member 3 is closed on one side by a closure element 17 and on the opposite side abuts base member 5. Heat transfer member 3 has apertures 18 on the surfaces which are in contact with closure element 17 and base member 5. The apertures 18 are configured to receive sealing elements or a sealing material.

The fluid is fed from heat transfer passage 14 to a through-channel 19 in base member 5, and passes through the channel 19 to control unit 6. Control unit 6 has a valve mechanism 20 which is configured to move a valve piston 21. In the selected orientation of device 1, valve piston 21 performs a vertical movement and causes closure or opening of a through opening 23. When valve piston 21 is in the open position, fluid is fed to a discharge passage 25. Through discharge passage 25, which in the chosen embodiment is partially disposed in mouthpiece holder 10 and in mouthpiece 11, fluid is fed to a discharge opening 9 and delivered therethrough onto the substrate.

Valve mechanism 20 is connected to base member 5 and partially extends into the interior of base member 5. Sealing elements 22 are provided in apertures and prevent the discharge of fluid at those locations. The nozzle arrangement likewise has apertures 24 which are configured to receive sealing elements or sealing material.

Figure 4:
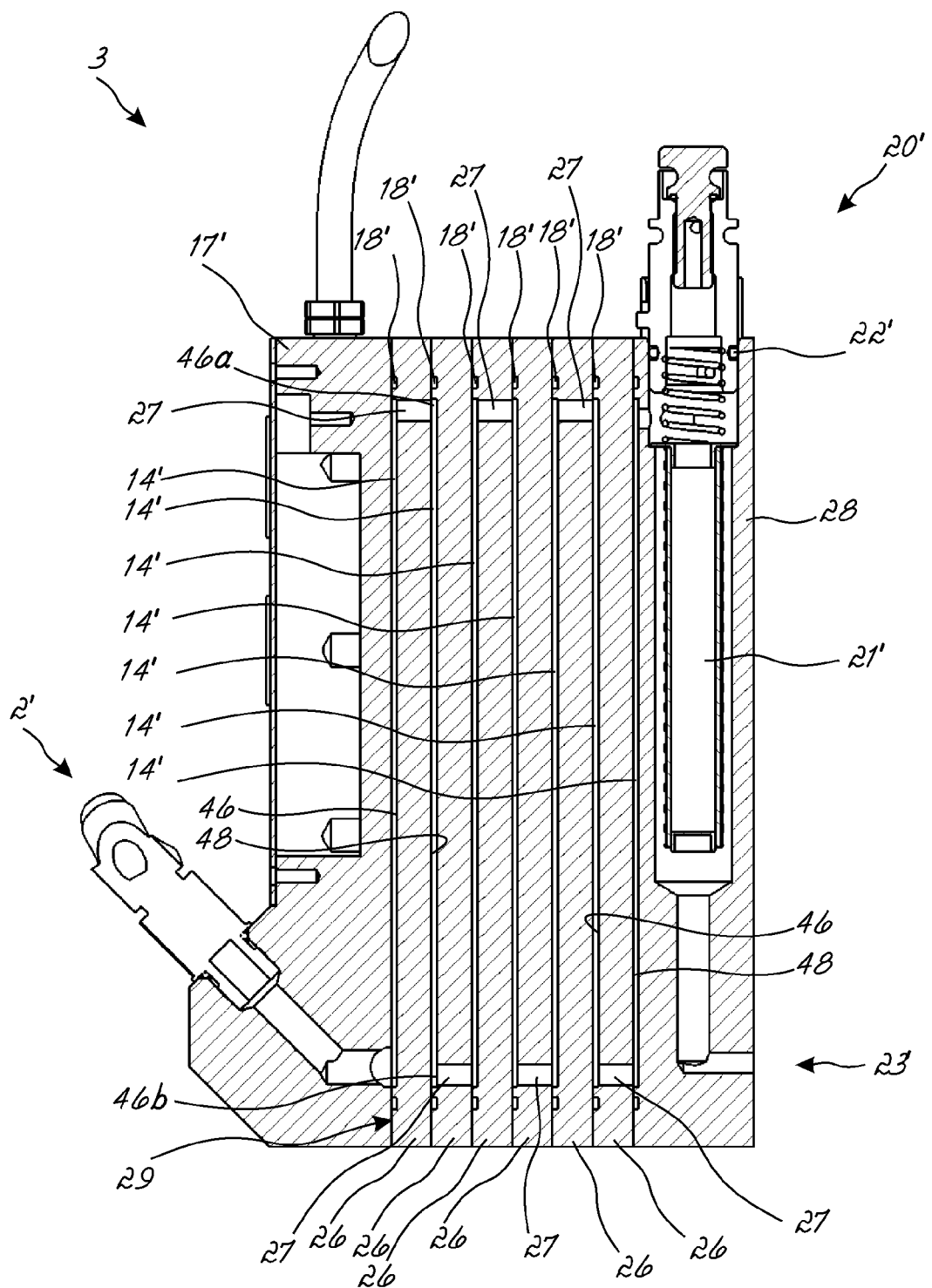
FIG. 4 shows a cross-sectional view of another embodiment of a heat transfer member.

FIG. 4 shows an alternative embodiment of a heat transfer member 3, which is connected in an appropriate manner to a base member 5 as shown in FIG. 3, and which also cooperates functionally with the components thereof. This embodiment has a plurality of individual plates 26 with longitudinal apertures 14' that are embodied in a first end surface 46 of the plates 26 and which form a heat transfer passage—in sandwich construction—in that a transverse through opening 27 extending from the first end surface 46 through the thickness of plate 26 to a second end surface 48 is provided in a portion of each plate, thus forming a passage for the fluid from one longitudinal aperture 14' to the next. To this end, each of the longitudinal apertures 46 includes a first end 46a communicating with a transverse through opening 48 of a plate 26 located adjacent the first end surface 46, and a second end 46b communicating through the transverse through opening 48 of the plate 26, thereby collectively defining a meandering back-and-forth flow path. Heat transfer member 3 is closed on one side by a closure element 17'. The closure element 17' also delivers fluid from an inlet opening 2' to the heat transfer member 3. In the chosen embodiment, a second closure element 28 configured to receive a filter arrangement 20' is provided on the opposite side. Filter arrangement 20' partially extends into the interior of second closure element 28. A filter element 21' extends in the vertical direction in the heat transfer member 3 oriented as shown. A through opening 23' through which fluid can pass after filtration is connected to a through passage 19, which is not shown here but corresponds to the one shown in FIG. 3.

Plates 26 each have apertures 18' on a contact surface 29 for receiving a sealing element. The second closure element 28 likewise has an aperture 18' for receiving a sealing element. Filter arrangement 20' likewise has an aperture 22' for a sealing element.

FIG. 5 shows a perspective view of an integral embodiment of a heat transfer member 3 as shown in FIG. 3. Flow channel 14 is disposed inside heat transfer member 3 and has a meander-shaped configuration. The flow cross-section decreases in the direction of flow—which runs from bottom to top when the heat transfer member 3 is oriented as shown in FIG. 5. The fluid enters the heat transfer member 3 through an opening 31. The fluid leaves heat transfer member 3 through an opening 32. Aperture 18 for receiving a sealing element is embodied in the form of a circumferential groove. Heat transfer member 3 also has through bores 30 through which fasteners 4 (not shown) extend.

Figure 6:
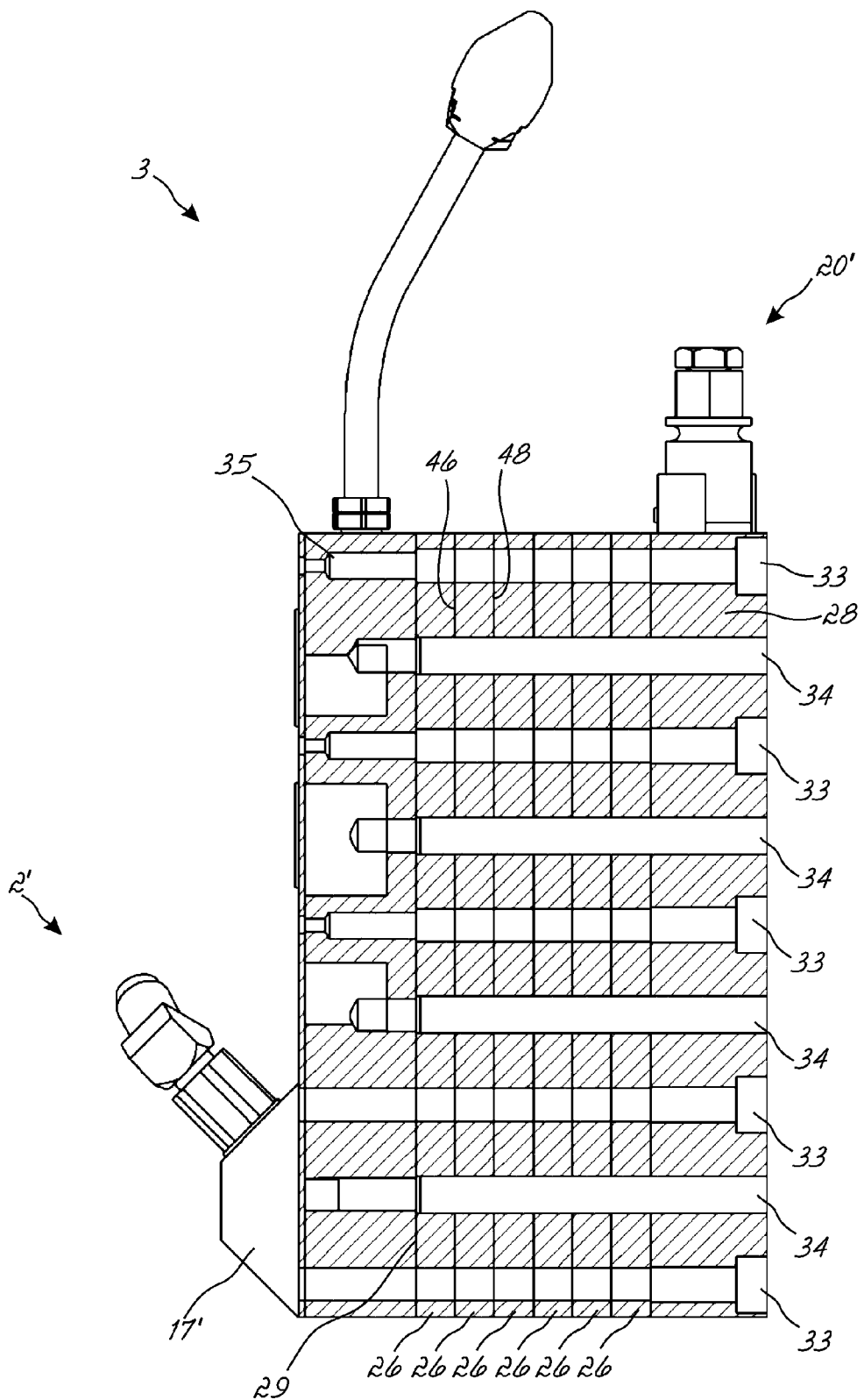
FIG. 6 shows a cross-sectional view of an embodiment of a heat transfer member with apertures for heating elements.

The arrangement of heating elements is shown by way of example in FIG. 6 for an embodiment comprising a plurality of individual plates 26. In a cross-sectional plane parallel to and in the vicinity of the lateral surfaces of the heat transfer member 3, plates 26 and second closure element 28 have bores 33 configured to receive fasteners. Closure element 17' has threaded bores 35 in which screws for fixing plates 26 and closure elements 17', 28 can engage with each other. The second closure element 28 and plates 26 also have bores 34 which are configured to receive substantially cylindrical heating elements. Plates 26 are arranged in relation to each other in such a way that bores 33, 34 of the respective plates are coaxial to each other, with the result that the screws and inserted heating elements can extend through the plates.

While the present invention has been illustrated by a description of various illustrative embodiments and while these embodiments have been described in some detail, it is not the intention of the Applicants to restrict or in any way limit the scope of the appended claims to such detail. Additional advantages and modifications will readily appear to those skilled in the art. The various features discussed herein may be used alone or in any combination depending on the needs and preferences of the user. This has been a description of illustrative aspects and embodiments the present invention, along with the preferred methods of practicing the present invention as currently known. However, the invention itself should only be defined by the appended claims.

What is claimed is:

1. An adhesive dispensing device comprising:
a primary manifold including a closure element with a fluid inlet, a base member having a through channel, and a heat transfer member positioned between said closure element and said base member, said heat transfer member communicating with said fluid inlet and said through channel and including a plurality of heat transfer surfaces which are arranged in a parallel and spaced apart relationship with each other;
a nozzle attached to and in fluid communication with said through channel of said base member, said nozzle adapted to discharge the adhesive;
a control unit coupled to said base member and including a valve mechanism with a valve piston extending into said base member, said valve piston moveable to selectively block flow of adhesive from said through channel to said nozzle; and
a heat transfer passage disposed through the heat transfer member and defining a flow path for the adhesive, said heat transfer passage having a cross-sectional area that varies along said flow path, wherein said heat transfer passage is defined by respective spaces between adjacent heat transfer surfaces, and the space between adjacent heat transfer surfaces decreases in a direction of flow along said flow path.

2. The adhesive dispensing device of claim 1, wherein said heat transfer passage comprises a substantially meander-shaped flow path.

3. The adhesive dispensing device of claim 1, wherein said heat transfer member comprises a plurality of plates, each plate being respectively connected to an adjacent plate, and said plurality of plates include apertures adapted to receive heating elements.

4. The adhesive dispensing device of claim 3, wherein each of said plurality of plates includes an end portion with a flow aperture, and said heat transfer passage forms by a connection of the flow apertures in adjacent plates.

5. The adhesive dispensing device of claim 1, wherein said heat transfer member comprises a heat-conductive material.

6. The adhesive dispensing device of claim 1, wherein said heat transfer passage includes a series of parallel generally planar passage portions located between said entry opening and said exit opening, each of said generally planar passage portions including a first end connected by a U-shaped passage portion to the previous generally planar passage portion in said series and a second end connected by a U-shaped passage portion to the next generally planar passage portion in said series, thereby defining a meandering back-and-forth flow path for the adhesive from said entry opening to said exit opening.

7. The adhesive dispensing device of claim 6, wherein said cross sectional area of said heat transfer passage decreases along said flow path.

8. The adhesive dispensing device of claim 6, wherein said heat transfer member comprises a plurality of heat transfer surfaces which are arranged in a parallel and spaced apart relationship with each other to define said generally planar passage portions.

9. An adhesive dispensing device comprising:
a primary manifold including a fluid inlet and a heat transfer member communicating with said fluid inlet and including an exit opening, said heat transfer member including a plurality of parallel plates connected to one another, each of said plates including a first end surface with a longitudinal aperture positioned along said first end surface, a second end surface opposite said first end surface, and a transverse through opening extending between said first and second end surfaces and communicating with said longitudinal aperture; and
a nozzle attached to and in fluid communication with said exit opening of said primary manifold, said nozzle adapted to discharge the adhesive,
wherein a heat transfer passage is defined through the heat transfer member by said longitudinal apertures and said transverse through openings, each of said longitudinal apertures including a first end communicating with a transverse through opening of a plate located adjacent said first end surface and a second end communicating through said transverse through opening to a plate located adjacent said second end surface, thereby defining a meandering back-and-forth flow path for the adhesive from said fluid inlet to said exit opening,
wherein said heat transfer passage has a cross-sectional area that varies along said flow path, and
wherein each of said plates further includes a circumferential periphery extending between said first and second end surfaces and a circumferential aperture configured to receive a sealing element along said first end surface, said circumferential aperture surrounding said longitudinal aperture such that said longitudinal aperture and said transverse through opening of each of said plates is surrounded by said circumferential aperture and said circumferential periphery.

10. The adhesive dispensing device of claim 9, wherein said heat transfer passage has a cross-sectional area that decreases along said flow path.

* * * * *